United States Patent
Walther

(10) Patent No.: US 6,959,621 B1
(45) Date of Patent: Nov. 1, 2005

(54) WIPING DEVICE

(75) Inventor: Bernd Walther, Bietigheim-Bissingen (DE)

(73) Assignee: Valeo Auto-Electric Wischer und Motoren GmbH, (DE)

( * ) Notice: Subject to any disclaimer, the term of this patent is extended or adjusted under 35 U.S.C. 154(b) by 0 days.

(21) Appl. No.: 10/089,798

(22) PCT Filed: May 20, 2000

(86) PCT No.: PCT/EP00/04600

§ 371 (c)(1),
(2), (4) Date: Apr. 3, 2002

(87) PCT Pub. No.: WO01/25065

PCT Pub. Date: Apr. 12, 2001

(30) Foreign Application Priority Data

Oct. 4, 1999 (DE) .................................. 199 47 620

(51) Int. Cl.[7] ........................... B60S 1/08; F16H 57/02

(52) U.S. Cl. ..................... 74/425; 74/42; 74/421 A; 74/606 R

(58) Field of Search .................. 74/25, 42, 47, 74/48, 421 A, 425, 545, 548, 549, 606 R, 74/608, 609

(56) References Cited

U.S. PATENT DOCUMENTS

| | | | | |
|---|---|---|---|---|
| 4,003,681 A | * | 1/1977 | Wildhaber | 74/609 |
| 4,118,134 A | | 10/1978 | Mansel | 403/282 |
| 4,263,821 A | * | 4/1981 | Savage et al. | 74/595 |
| 4,543,839 A | * | 10/1985 | Buchanan et al. | 74/98 |
| 4,838,116 A | * | 6/1989 | Saito et al. | 74/595 |
| 4,979,404 A | * | 12/1990 | Nakata et al. | 74/409 |
| 5,622,077 A | * | 4/1997 | Blanchet et al. | 74/42 |
| 5,768,942 A | * | 6/1998 | Gruber et al. | 74/89.14 |
| 5,823,065 A | | 10/1998 | Walter | 74/519 |
| 5,848,553 A | * | 12/1998 | Miyazaki | 74/42 |
| 5,855,140 A | * | 1/1999 | Imamura | 74/42 |
| 6,014,915 A | * | 1/2000 | Evans | 74/606 R |

FOREIGN PATENT DOCUMENTS

EP 0 798 181 10/1997

* cited by examiner

*Primary Examiner*—William C Joyce
(74) *Attorney, Agent, or Firm*—Young & Basile, P.C.

(57) ABSTRACT

A wiping device for wiping window panes on vehicles includes a wiping motor, a gear mechanism situated on a drive shaft of the wiper motor, a gear housing which surrounds the gear mechanism, a gear housing cover which is situated on the gear housing, a gear output shaft and a crank which is located on the gear output shaft on the side of the gear housing facing away from the gear in a rotationally fixed manner. The connection between the gear output shaft and the crank is a press connection.

4 Claims, 3 Drawing Sheets

WIPING DEVICE

BACKGROUND

The invention relates to a wiping device for wiping window glass on vehicles, having a wiper motor, a gear mechanism disposed on the input shaft of the wiper motor, a gear housing enclosing the gear mechanism, a gear housing cover disposed on the gear housing, an output shaft and a crank located rotationally immovable on the output shaft on the side of the gear housing facing away from the gear mechanism. The invention additionally relates to a process for attaching the crank to the output shaft.

According to the generally known prior art, the crank is rotationally immovably secured to the output shaft by means of a threaded connector. To do this, the crank is installed onto the end of the output shaft facing the crank by means of an aperture present in the crank. The output shaft has a threaded section on its end onto which a retaining nut is threaded, by means of which the crank is frictionally connected to the output shaft.

Prior art of this type has the specific disadvantage that the retaining nut in its assembled state lies against the surface of the crank facing away from the gear housing. Because of the retaining nut, it is necessary to configure the crank in such a way that a wiper linkage connected to the crank at the free end of the crank by a swivel head is not obstructed by the retaining nut when the crank is rotating. In this situation, specific provision can be made for the crank to be bent in the direction away from the gear housing. To do this however, an extra bending step is required when making the crank, which is associated with complexity and cost. In addition, a bend of this type in the crank results in an uneven distribution of the compressive and tensile stresses in the crank because of the forces and torque to be transmitted with the crank.

The object of the invention is therefore to propose a wiping device in which a special configuration of the crank is not necessary because of the location of the crank on the output shaft. The crank is still to be connected permanently to the output shaft in a way that ensures functional reliability.

SUMMARY

To accomplish the object, a wiping device of the type described at the beginning is proposed which envisions that the output shaft-to-crank connection is a press fitting.

A press fitting of this type has the specific advantage that no retaining nut on the surface of the crank facing away from the gear mechanism or any other retaining element is present to retain the crank on the output shaft. Instead, the end face of the output shaft ends flush with the crank, or does not extend beyond the surface of the crank. This renders a special configuration of the crank unnecessary because of a retaining element present on the surface of the crank. Under the invention the crank therefore does not need to be bent and can thus be configured flat.

In addition, an output shaft-to-crank connection in the form of a press fitting can be implemented easily and economically by mechanical means.

A further advantage of a connection of this type is that no additional components such as retaining nuts, threaded sections, washers or the like are needed to implement the output shaft-to-crank connection.

In a preferred embodiment of the invention the inner part of the press fitting is the output shaft and the outer part of the press fitting is a cylindrical aperture present in the crank. A press fitting of this design has the advantage that the output shaft already has a round cross section, so that only a cylindrical bore with matching tolerances has to be made in the crank. The joining surfaces are thereby cylindrical.

In a further development of the invention it is envisioned that the output shaft is staked to the crank. With a stake fitting of this type, for example, the area of the end face of the output shaft is plastically deformed and thereby displaced in such a way that the output shaft, at least over a short section, marginally grips the crank, or the cylindrical bore in the crank respectively, from behind. In order to make staking of this kind possible, provision can be made for the free end of the output shaft to protrude a very small amount through the cylindrical bore on the side of the crank facing away from the gear housing and for the protruding section to be plastically deformed or displaced.

In a further development of the invention, provision is made for the cylindrical bore in the crank on the side facing away from the gear housing to have a chamfer, a cylindrical depression or an otherwise shaped cutout. A cylindrical bore configured in this way has the advantage that the staked section of the output shaft can be accommodated by the chamfer, the cylindrical depression or the otherwise shaped cutout. In this way, a smooth and flat surface on the crank is ensured even though the corresponding section of the output shaft is staked.

In another advantageous embodiment of the invention provision is made for the output shaft to extend into the area towards the gear housing or the gear housing cover on the side facing away from the crank, and for the gear housing or the gear housing cover to have an opening in this area. A configuration of this type has the specific advantage that, because of the opening, the end of the output shaft facing away from the crank is accessible and the pressing procedure or the staking procedure can be performed with greater ease.

In a further development of the invention, provision is made for the end of the output shaft facing away from the crank to be supported through the opening for press fitting and/or staking the output shaft to the crank. The ability to be thus supported simplifies the press fitting and/or staking process in an advantageous way.

In a further advantageous embodiment of the invention, the opening can be closed specifically with a cover. The ability to close the opening ensures that humidity, dust or dirt can be effectively prevented from entering the gear housing.

To accomplish the object of the invention above, an inventive process to assemble a wiping device for wiping window glass on vehicles, having a wiper motor, a gear mechanism disposed on the input shaft of the wiper motor, a housing enclosing the gear mechanism, and having a crank rotationally immovably located on the gear output shaft is additionally envisioned, which provides for the output shaft to be pressed into a cylindrical bore in the crank and if necessary staked. The pressing can be carried out specifically by longitudinal pressing, shrinking or expanding.

BRIEF DESCRIPTION OF THE DRAWING

Additional advantageous embodiments and details of the invention can be found in the following description, in which the invention is described in greater detail and explained on the basis of the embodiments shown in the drawing.

DETAILED DESCRIPTION

Figure 1:
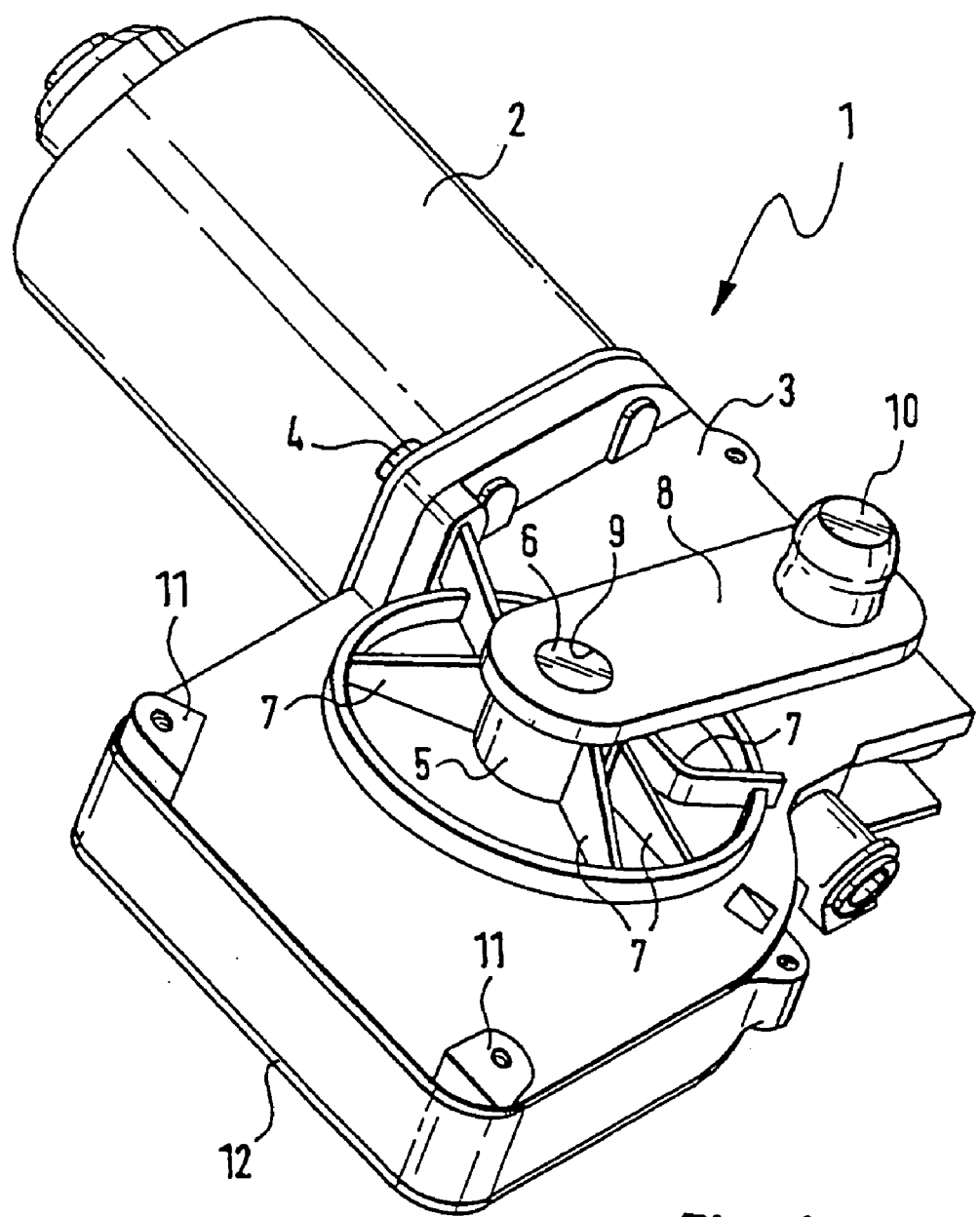
FIG. 1 shows a wiping device in an isometric view from above.

In FIG. 1, a wiping device 1 for wiping window glass on vehicles is shown, which has a wiper motor 2 and a gear mechanism located on the output shaft, which cannot be seen, of the wiper motor 2, which is enclosed by a gear housing 3. The gear housing 3 is rigidly attached to the wiper motor 2 with a means of fastening, such as a bolt 4 for example. Only a gear output shaft 6 of the gear located in the gear housing 3, which rides in a integral bearing insert 5 in the gear housing, as is shown in FIG. 1. Several stiffening ribs 7 are present in the gear housing 3 to stiffen the gear housing 3 in the area around the bearing insert 5.

Figure 3A:
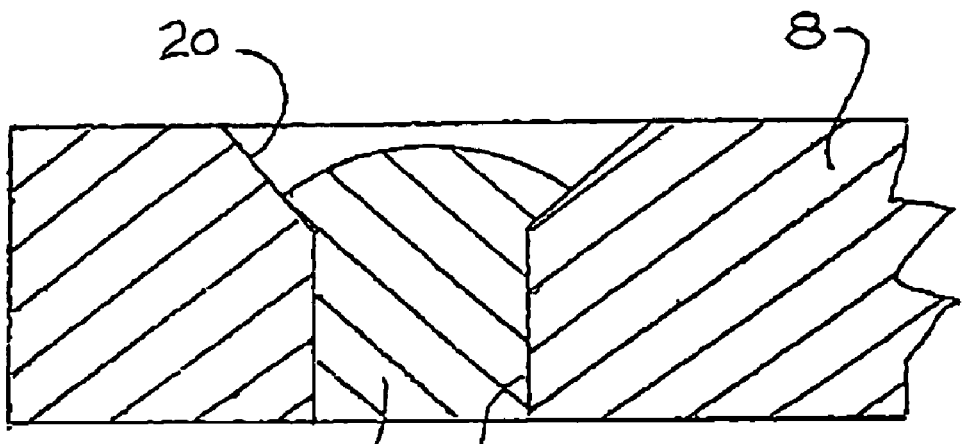
FIG. 3A shows a cross-sectional view of a portion of a crank of the wiping device having a cylindrical bore with a chamfer.
Figure 3B:
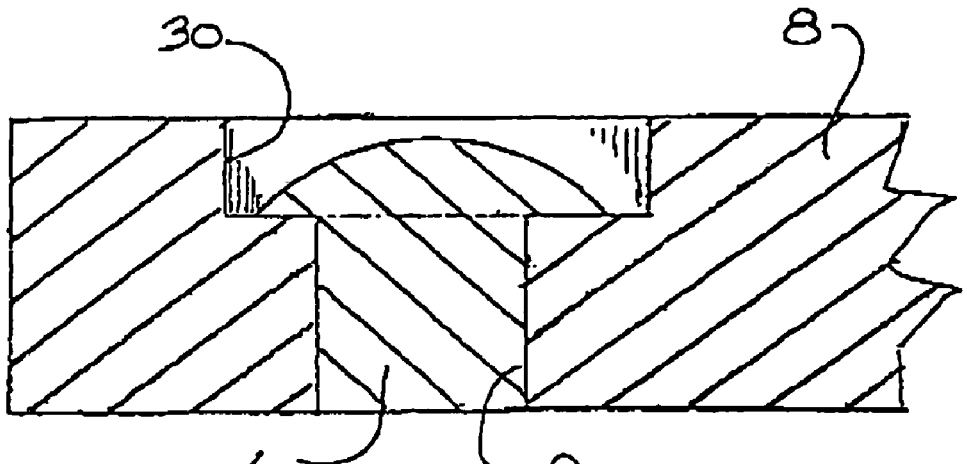
FIG. 3B shows a cross-sectional view of a portion of a crank of the wiping device having a cylindrical bore with a cylindrical depression.
Figure 3C:
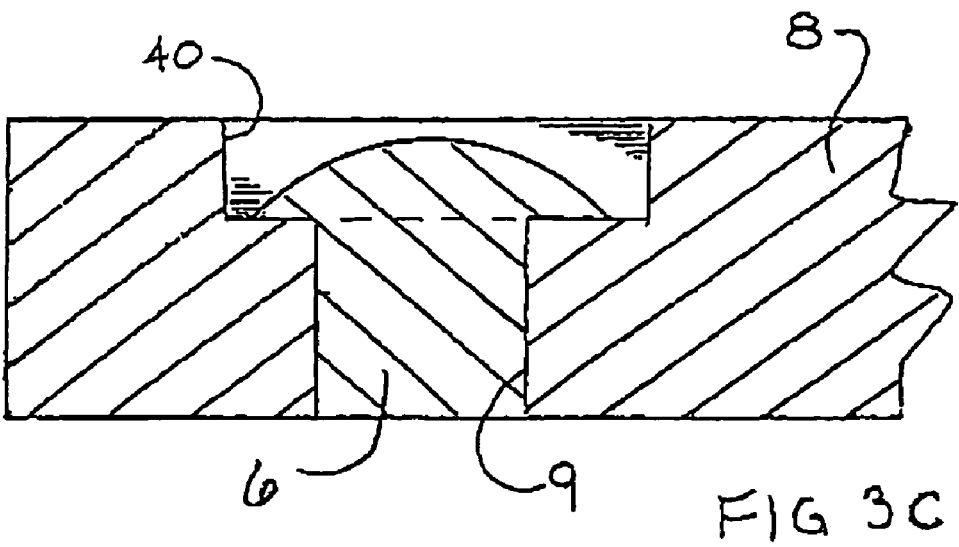
FIG. 3C shows a cross-sectional view of a portion of a crank of the wiping device having a cylindrical bore with a recess.

A crank 8 is rotationally immovable disposed on the output shaft 6 at the free end of the output shaft 6 extending beyond the bearing insert 5. The output shaft-to-crank connection is a press fitting under the present invention. The inner part of the press fitting is the output shaft 6 which is surrounded by the outer part of the press fitting, namely by a cylindrical bore 9 on the crank 8. The joint surface between the output shaft 6 and the cylindrical bore 9 is in this case cylindrical. The cylindrical bore 9 can also have a chamfer 20, a cylindrical depression 30, or a recess having a shaped cutout 40 as shown in FIGS. 3A–3C respectively.

As an alternative to this, provision can also be made under the invention for the inner part to be a pin on the crank 8 and for the outer part to represent an axial cylindrical bore in the output shaft 6.

In the embodiment of the invention shown in FIG. 1, the output shaft 6 is also staked to the crank 8. By means of such a staked connection, the torque transmittable over the press fitting is increased and the crank 8 is additionally secured on the output shaft.

As can be clearly seen from FIG. 1, the end face of the free end of the output shaft 6 together with the surface of the crank 8 facing away from the gear housing forms a largely plane surface geometry. With this, the advantage is gained that bending the crank 8 because of a retaining element which must be disposed on the crank 8 in accordance with the prior art to retain the crank 8 to the output shaft 6 is not required. Instead, under the invention a swivel head 10 present on the side of the crank 8 facing away from the output shaft 6 can be coupled to a wiper linkage, which is specifically disposed parallel to the crank 8 and by means of which the wiper blades lying on the window glass of the vehicle can be driven. A special geometric adaptation or configuration of the crank 8 because of the rotationally immovable disposition of the crank 8 on the output shaft 6 is not necessary under the present invention.

The gear housing 3 has in addition two threaded bosses 11, which are provided to attach the gear housing 3 with wiper motor 2 to the vehicle body.

A gear housing cover 12 which is configured to be removable is also shown in FIG. 1.

Figure 2:
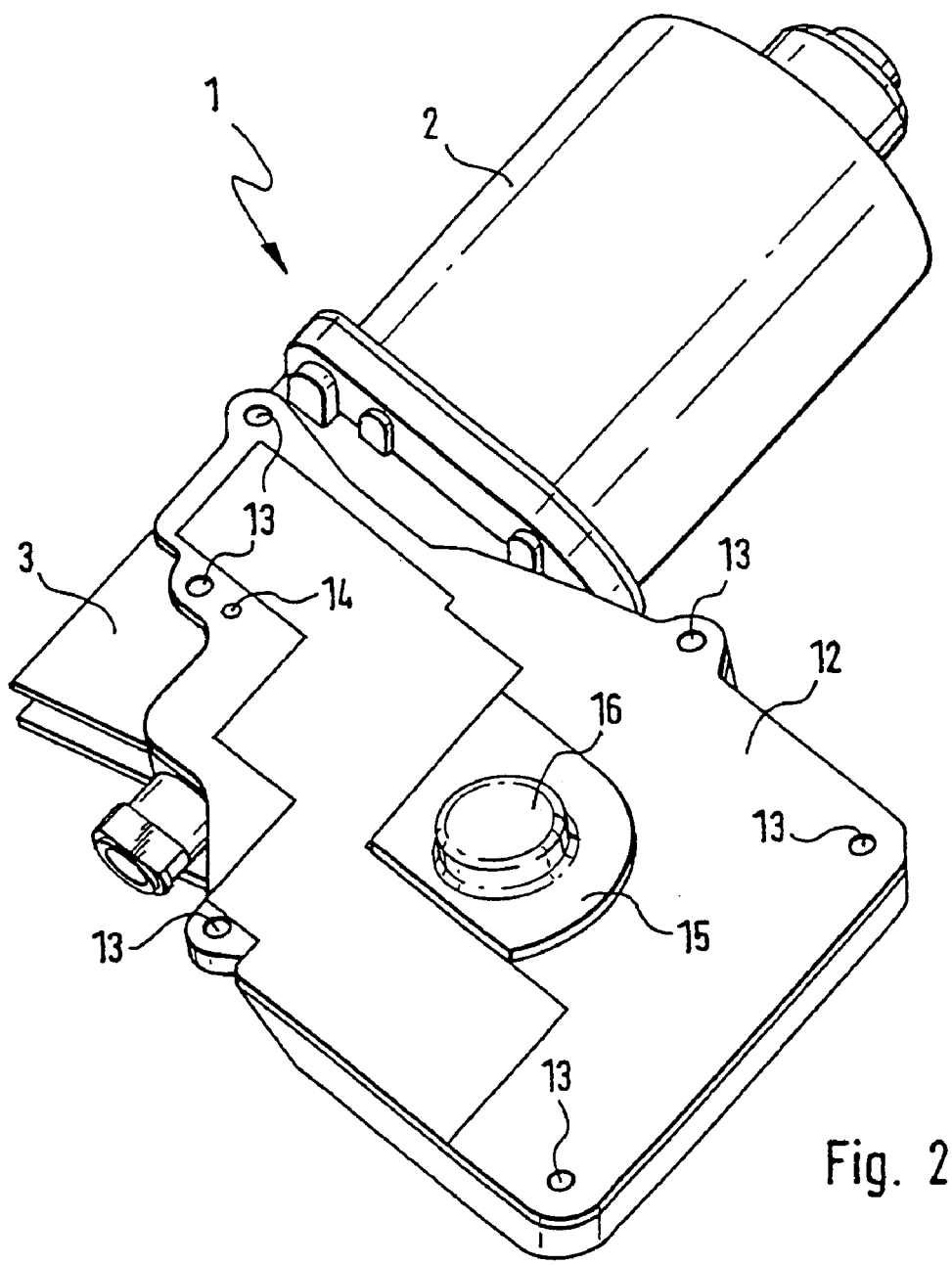
FIG. 2 shows the same wiping device in an isometric view from diagonally below.

In FIG. 2, in which the wiping device 1 is seen from below, the full size of the gear housing cover 12 is clearly identifiable. The gear housing cover 12 has various apertures 13, through which retaining bolts, not shown, can be inserted and tightened in the gear housing 3 to attach the gear housing cover 12 to the gear housing 3. To center the gear housing cover 12 to the gear housing 3, the gear housing cover 12 has a centering eye into which a centering pin located on the gear housing 3 can be engaged.

A cover 15 is also shown in FIG. 2, which is furnished to cover an opening in the gear housing cover 12. The opening is located in the area in which the output shaft 6 extending through the gear housing 3 protrudes beyond the gear housing cover 12. To accommodate this end of the output shaft 6 the cover 15 has a raised bubble 16.

The embodiment of the invention shown and described in FIG. 2 has the specific advantage that the end of the output shaft 6 facing away from the crank 8 is accessible and can be supported for the press fitting and staking of the output shaft 6 with the crank 8 by removing the cover 15. In this way, the output shaft 6 can be press fitted or staked to the crank 8 without the need for removing the gear housing cover 12 from the gear housing 3. Under the present invention, it suffices if the removable cover 15 is removed from the gear housing cover 12 in order to install and support the press and/or staking equipment on the end of the output shaft available under the cover 15.

All features shown in the description, the following claims and the drawing can be essential to the invention both individually and in any combination with each other.

What is claimed is:

1. In a wiping device for wiping window glass on vehicles, having a wiper motor, a gear mechanism disposed on the input shaft of the wiper motor, a gear housing enclosing the gear mechanism, a gear housing cover disposed on the gear housing, and an output shaft, the improvement comprising: a crank rotationally immovably positioned on a first end of the output shaft on an exterior side of the gear housing wherein the gear housing is disposed between and adjacent to the crank and the gear mechanism, and wherein the output shaft-to-crank connection is a press fitting and that the gear housing cover has a separate access opening on a side facing away from the crank for supporting a second end of the output shaft during the press fit operation, wherein the second end of the output shaft on the side facing away from the crank extends beyond the gear housing cover and wherein the gear housing cover has the separate access opening in this area and wherein the access opening is closed with another cover having a configuration to enclose the extending end of the output shaft.

2. The improvement to the wiping device in accordance with claim 1, wherein an inner part of the press fitting is the output shaft and an outer part of the press fitting is a cylindrical bore in the crank.

3. The improvement to the wiping device in accordance with claim 1, wherein the output shaft is staked to the crank.

4. The improvement to the wiping device in accordance with claim 3, wherein a cylindrical bore in the crank has a one of chamfer, a cylindrical depression and a recess on the side facing away from the gear housing.

* * * * *